UNITED STATES PATENT OFFICE.

ABEL WAINWRIGHT, OF SPRING CITY, PENNSYLVANIA.

IMPROVEMENT IN CEMENTS FOR STOVE-PUTTY.

Specification forming part of Letters Patent No. 184,485, dated November 21, 1876; application filed October 18, 1876.

*To all whom it may concern:*

Be it known that I, ABEL WAINWRIGHT, of Spring City, Chester county, Pennsylvania, have invented a new and useful Cement for Stove-Putty, which compound is fully described in the following specification.

My invention relates to putty made with a pulverized material mixed with linseed-oil.

I take about two parts of chalk and one of graphite, such as are mined in Boyertown, Bucks county, Pennsylvania. This graphite contains a large percentage of sand and grit. The chalk and the graphite I grind and pulverize together, and sell the compound to be mixed with oil when required for use. This putty is a valuable dark-colored compound for filling the joints of stoves.

It is evident this cement may be made with whiting in place of chalk, and plumbago and sand in place of the graphite.

I do not restrict myself to the exact proportions herein stated, as a mixture of equal parts of graphite and chalk will make a good cement, nor to a graphite with the same percentage of sand.

I claim—

A cement for stove-putty of pulverized chalk and graphite, similar in its qualities to that herein described.

ABEL WAINWRIGHT.

Witnesses:
   EDWD. BROWN,
   JOHN F. GRANT.